Patented Feb. 10, 1953

2,628,230

UNITED STATES PATENT OFFICE 2,628,230

AZO DYES OF THE ANTHRAQUINONE SERIES

Frederic B. Stilmar, Wilmington, Del., assignor to E. I. du Pont de Nemours & Company, Wilmington, Del., a corporation of Delaware No Drawing. Application March 15, 1949, Serial No. 81,617

6 Claims. (Cl. 260—157)

1

This invention relates to the preparation of new dyes of the anthraquinone series, and more particularly to the preparation of anthraquinone oxdiazoles which dye cotton from the usual hydrosulfite vats in red shades.

The anthraquinone vat dyes are known to be of particular value because of their excellent fastness properties, and, while a large range of colors has been produced commercially, there has not been produced a red dye in this class which will dye in the bright shades desirable and have the good fastness properties of dyes of this class in general. Several red dyes have been produced in the anthraquinone series, but they lack the strength or brightness or certain fastness properties which are particularly desirable and which usually identify the dyes of this class.

It is an object of the present invention to produce new vat dyes of the anthraquinone series which dye in relatively bright red shades and which exhibit excellent fastness properties and high tinctorial strength. A more specific object of the invention is to produce oxdiazoles of the anthraquinone series by effecting ring closure of the acylated hydrazines produced by condensing 1-amino- or 1-nitro-anthraquinone-2-carbonyl hydrazines with organic dicarboxylic acid chlorides.

The acylated hydrazines employed as the starting intermediates for producing the dyes of the present invention are more particularly disclosed and claimed in my co-pending application Serial No. 81,616, filed March 15, 1949. These acylated hydrazines, which have the general formula:

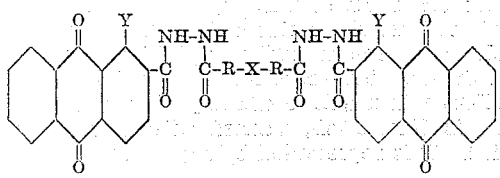

are produced by reacting a 1-amino- or 1-nitro-anthraquinone-2-carbonyl hydrazine with an organic dicarboxylic acid chloride of the formula:

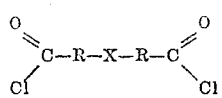

2

In the above formulae, R stands for a hydrocarbon radical of the group consisting of benzene and diphenyl radicals and X for a connecting bridge of the group consisting of $-N=N-$, $-CH=CH-$, $-CH_2-$, $-O-$, $-S-$, $-SO_2-$ and $-CO-$, and Y stands for a substituent of the group consisting of $-NH_2$ and $-NO_2$. This class of acid chlorides is exemplified by azodiphenyl-dicarbonyl chlorides, stilbene-dicarbonyl chlorides, diphenylmethane-dicarbonyl chlorides, diphenylsulfide-dicarbonyl chlorides, diphenylether-dicarbonyl chlorides, diphenylsulfone-dicarbonyl chlorides and benzophenone-dicarbonyl chlorides.

According to the present invention, the acylated hydrazines produced from the dicarboxylic acid chlorides are subjected to a ring closure reaction which is brought about by the aid of acid condensing agents such as thionyl chloride, phosphorus oxychloride, p-toluene sulfonic acid, etc., in an inert solvent such as nitrobenzene or the chlorobenzenes. In this reaction the hydrazide groups are ring closed to the oxdiazoles to give compounds of the general formula:

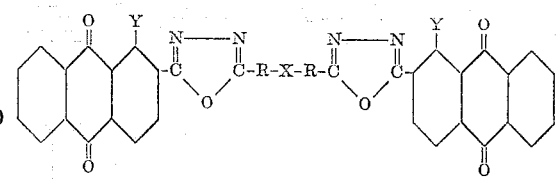

in which Y and R have the same significance as above given.

The following examples are given to illustrate the invention. The parts used are by weight.

Example 1

8.5 parts of azobenzene-4,4'-dicarbonyl chloride, 20 parts of 1-nitroanthraquinone-2-carbonyl hydrazine and 200 parts of nitrobenzene are mixed under agitation and slowly heated to 170°–175° C. This temperature is maintained for one hour. The acylated hydrazine, in the form of light yellow needles, is filtered off, washed with benzene and dried.

Twenty (20) parts of this acylated hydrazine, 40 parts of thionyl chloride and 300 parts of nitrobenzene are heated under reflux at 165°–175° C. for four hours. The resulting yellow nitroanthraquinone oxdiazole is filtered off and washed with benzene and dried. It dissolves in sulfuric acid with a yellow color, and dyes cotton from a red alkaline hydrosulfite vat in scarlet shades of good fastness properties. It has the following formula:

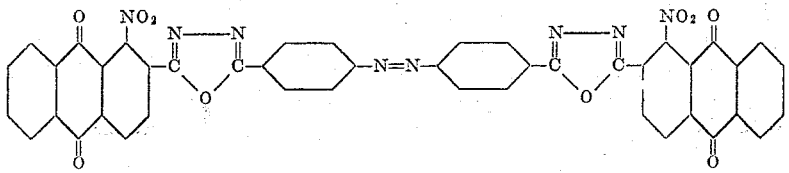

The nitro groups are reduced to amino groups during the vatting. The nitro groups may also be replaced by amino groups by passing ammonia through a suspension of the nitro oxdiazole in nitrobenzene at 175° C. or by autoclaving the nitro oxdiazole with 10% $NH_4OH$ at 170° C.

The red colored aminoanthraquinone oxdiazole also dissolves in sulfuric acid with a yellow color and dyes cotton fast scarlet shades.

Example 2

A mixture of 9.2 parts of azobiphenyl-4,4'-dicarbonyl chloride, 13.7 parts of 1-nitroanthraquinone-2-carbonyl hydrazine and 200 parts of nitrobenzene is slowly heated to 175°–180° C. and agitated for three hours at that temperature. The acylated hydrazine, which precipitates as yellow plates, is filtered off, washed with benzene and dried.

Fifteen (15) parts of this acylated hydrazine, 30 parts of thionyl chloride and 250 parts of nitrobenzene are heated to 170°–180° C. for four hours. The brownish-yellow nitroanthraquinone ozdiazole is filtered off and washed with benzene and dried. It dyes cotton scarlet-orange shades from a red alkaline hydrosulfite vat. The dyeings are fast to alkali. It has the formula:

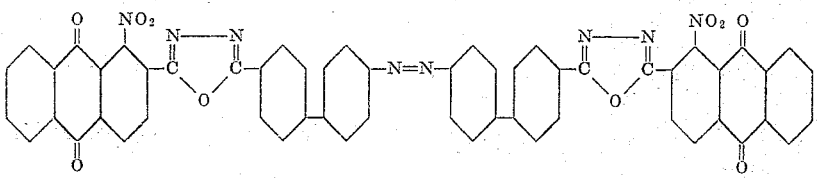

The nitro groups are reduced to amino groups in the vatting, but they may also be replaced by amino groups with ammonia in an inert solvent at 170°–180° C. as described in Example 1. The aminoanthraquinone oxdiazole dissolves in sulfuric acid with a reddish-yellow color, and dyes in scarlet-orange shades.

Example 3

A mixture of 4.6 parts of azobiphenyl-4,4'-dicarbonyl chloride, 6.7 parts of 1-aminoanthraquinone-2-carbonyl hydrazine and 150 parts of nitrobenzene is slowly heated to 170° C. and agitated for ten hours at this temperature. The acylated hydrazine, consisting of very fine orange particles, is filtered off and washed with benzene and dried.

2.3 parts of this acylated hydrazine, 100 parts of trichlorobenzene and 2 parts of p-toluene sulfonic acid are heated to 200°–210° C. for eight hours. The aminoanthraquinone oxdiazole dyes cotton a scarlet-orange shade, redder and somewhat stronger than the unring closed starting material, but it does not change color with alkali. It has the formula:

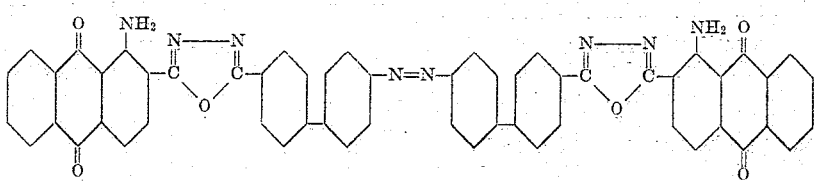

Example 4

A mixture of 5 parts of diphenylether-4,4'-dicarboxylic acid, 150 parts of nitrobenzene, 10 parts of thionyl chloride and 1/100 part of pyridine is heated at 100°–110° C. under reflux until solution occurs (with the formation of the diacid chloride).

The excess thionyl chloride is removed by blowing with a stream of air and there is then added 13.2 parts of 1-nitroanthraquinone-2-carbonyl hydrazine.

After heating the mass under agitation at 160°–165° C., for eight hours, the acylated hydrazine is filtered off, washed with benzene and dried.

Six (6) parts of this acylated hydrazine, 13 parts of thionyl chloride and 260 parts of orthodichlorobenzene are refluxed at 160°–170° C. for ten hours. The resulting nitroanthraquinone oxdiazole, in the form of compact colorless crystals, is filtered off, washed with benzene and dried. It is represented by the formula:

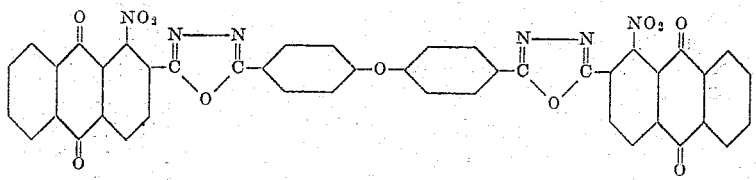

The nitro groups are easily replaced by amino groups when ammonia is passed through a nitrobenzene suspension at 175° C. The resulting amino oxdiazole is formed as bright red needles and dyes cotton in bright red shades from a red alkaline hydrosulfite vat. It dissolves in sulfuric acid with practically no color.

It is conveniently converted to the red crystalline aminoanthraquinone oxdiazole by passing ammonia through a nitrobenzene solution of the above colorless oxdiazole, as described in the above examples. The resulting amino compound has the formula:

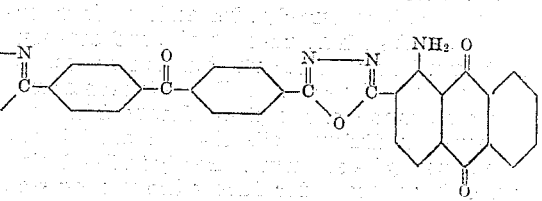

Example 5

A mixture of 1.7 parts of diphenylsulfone-4,4'-dicarbonyl chloride, 100 parts of ortho-dichlorobenzene and 3.4 parts of 1-nitroanthraquinone-2-carbonyl hydrazine is heated slowly to 160°–170° C. and held for two hours with stirring. The acylated hydrazine precipitates as small colorless crystals and is filtered off, washed with benzene and dried.

Three (3) parts of this acylated hydrazine, 7 parts of thionyl chloride and 130 parts of ortho-dichlorobenzene are heated at 160°–170° C. for eight hours under reflux. The colorless chunky crystals of the nitroanthraquinone oxdiazole are filtered off. It has the formula:

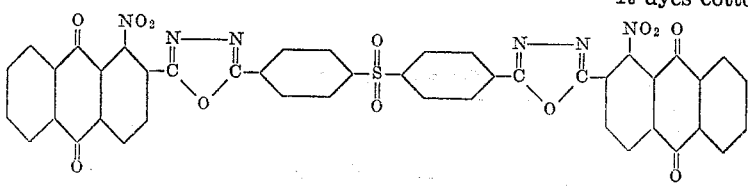

This nitroanthraquinone oxdiazole dissolves in sulfuric acid with almost no color.

The above nitroanthraquinone oxdiazole may be converted to the aminoanthraquinone oxdiazoledyestuff by passing ammonia through a nitrobenzene suspension as described in the above examples. The product separates as red needles which dye cotton in bluish-red shades. Its color in sulfuric acid is an extremely weak yellow.

Example 6

One (1) part of benzophenone-4,4'-dicarbonyl chloride, 2 parts of 1-nitroanthraquinone-2-carbonyl hydrazine and 35 parts of ortho-dichlorobenzene are mixed under agitation and the mixture is heated at 160°–170° C. for two hours. Then, under reflux, there is added 4.5 parts of thionyl chloride. After eight hours heating at 160°–170° C., the colorless nitroanthraquinone oxdiazole of the following formula results:

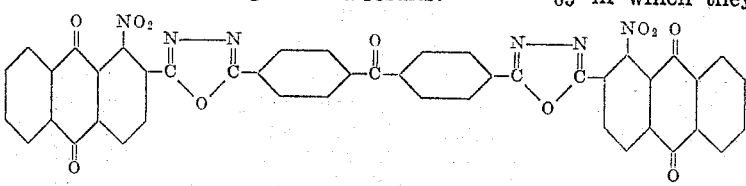

It dyes cotton red shades from a bluish-red colored vat. Its color in sulfuric acid is very pale yellow.

Example 7

6.1 parts of azobenzene-3,3'-dicarbonyl chloride, 13.6 parts of 1-nitroanthraquinone-2-carbonyl hydrazine and 260 parts of ortho-dichlorobenzene are converted to the acylated hydrazine by heating to 160°–170° C. for two hours. Then there is added, under reflux, 23 parts of thionyl chloride.

Refluxing is continued for eight hours at 160°–170° C. The ring closed nitroanthraquinone oxdiazole separates as microcrystalline needles. These are filtered off and washed with benzene, and dried. The light yellow product dissolves in concentrated sulfuric acid with a yellow color.

It dyes cotton in fast red shades from the hydrosulfite vat, during which process the nitro groups are reduced to the corresponding amine. Before reduction of the nitro groups, it has the formula:

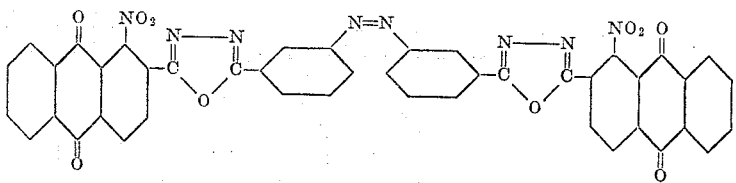

Diphenylmethane-3,3'-dicarbonyl chloride, diphenylsulfide-4,4'-dicarbonyl chloride or stilbene-4,4'-dicarbonyl chloride may be substituted for the particular dicarbonyl chlorides employed in the above examples to give new acylated anthraquinone-2-carbonyl hydrazines of similar reactivity and chemical properties. These compounds, when subjected to the action of the acid condensing agents as illustrated in the above examples, are converted to bright red-to-scarlet vat dyes having the good fastness properties of the anthraquinone vat dye class in general.

As illustrated in the above examples, the acylated hydrazines may be ring closed without isolation from the nitrobenzene or other solvent in which they are formed by adding the acid condensing agent and continuing the heating at the ring closure temperatures, generally within the range of from 130° to 210° C.

The dyes of this invention are obtained in high yields and of relatively high purity. While ring closure to the oxdiazole is preferably carried out at temperatures of from 160° to 170° C., this reaction may also be carried out at higher or lower temperatures such as from 130° C. to 210° C. The ring closure is preferably effected in an inert organic solvent such as the aromatic hydrocarbons or their nitrated or chlorinated derivatives, for instance, nitrobenzene, ortho-dichlorobenzene, trichlorobenzene and alpha-chloronaphthalene.

Where the dinitro-oxdiazole compound is obtained, it may be employed directly in the dyeing or printing process, for during the vatting step it is reduced to the corresponding amine. In most cases, however, the nitro groups may be replaced by the amino groups through amination either with ammonia in an organic solvent at elevated temperatures or with ammonium hydroxide under pressure at temperatures of from 120° to 200° C. These new vat dyes may be purified, when found desirable, by recrystallization from sulfuric acid or by treatment with oxidizing agent such as sodium dichromate in aqueous sulfuric acid suspensions.

The dyes of this invention all dye cellulose fibers from the usual alkaline hydrosulfite vat in red-to-scarlet shades of good to excellent general fastness properties. They exhibit exceptionally high tinctorial strength and may be employed in either the dyeing or printing processes by which the anthraquinone vat dyes are ordinarily applied to textile fibers.

I claim:

1. The anthraquinone oxdiazole compounds of the general formula:

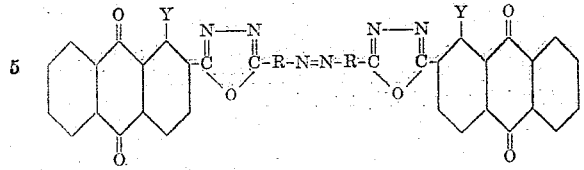

in which R stands for a hydrocarbon radical of the group consisting of benzene and diphenyl radicals and Y stands for a substituent of the group consisting of —NH$_2$ and —NO$_2$.

2. The anthraquinone oxdiazole compound of the formula:

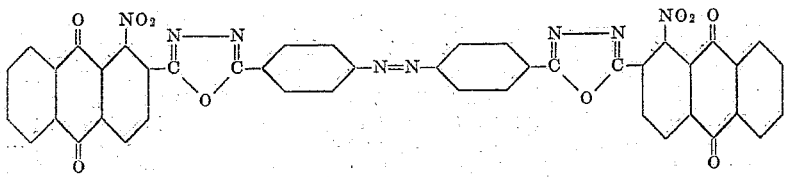

3. The anthraquinone oxdiazole compound of the formula:

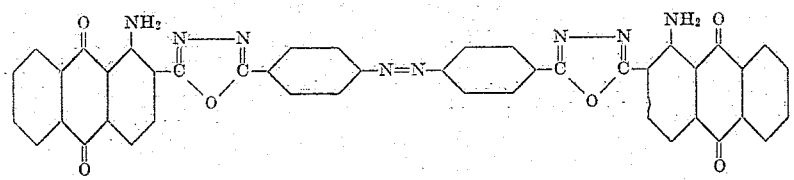

4. The anthraquinone oxdiazole compound of the formula:

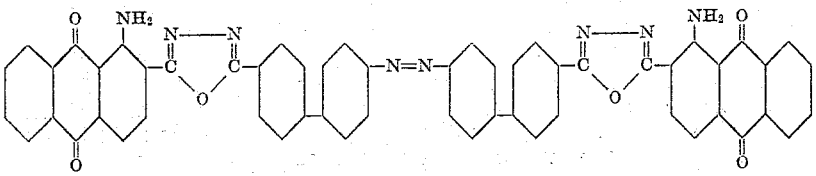

5. The anthraquinone oxdiazole compound of the formula:

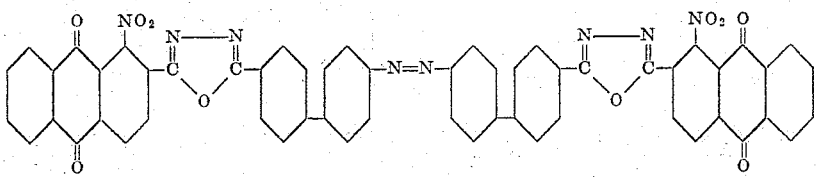

6. The anthraquinone oxdiazole compound of the formula:

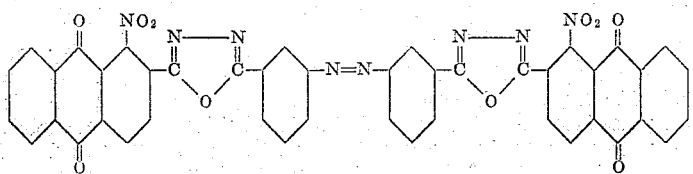

FREDERIC B. STILMAR.

REFERENCES CITED

The following references are of record in the file of this patent:

UNITED STATES PATENTS

| Number | Name | Date |
|---|---|---|
| 2,175,803 | Honold et al. | Oct. 10, 1939 |
| 2,228,455 | Honold et al. | Jan. 14, 1941 |
| 2,464,831 | Stillmar | Mar. 22, 1949 |
| 2,511,018 | Stillmar | June 13, 1950 |
| 2,511,019 | Stillmar | June 13, 1950 |